United States Patent
Franze

(10) Patent No.: US 9,242,388 B2
(45) Date of Patent: Jan. 26, 2016

(54) APPARATUS AND METHOD FOR CUTTING COLUMNAR ITEMS

(71) Applicant: Patrick L. Franze, Atwater, OH (US)

(72) Inventor: Patrick L. Franze, Atwater, OH (US)

(*) Notice: Subject to any disclaimer, the term of this patent is extended or adjusted under 35 U.S.C. 154(b) by 0 days.

(21) Appl. No.: 13/681,721

(22) Filed: Nov. 20, 2012

(65) Prior Publication Data

US 2013/0152759 A1 Jun. 20, 2013

Related U.S. Application Data

(63) Continuation of application No. 12/505,487, filed on Jul. 19, 2009, now abandoned.

(60) Provisional application No. 61/081,913, filed on Jul. 18, 2008, provisional application No. 61/158,214, filed on Mar. 6, 2009.

(51) Int. Cl.
| | |
|---|---|
| *B26D 3/16* | (2006.01) |
| *B26D 1/08* | (2006.01) |
| *B23D 21/00* | (2006.01) |
| *B23D 21/06* | (2006.01) |
| *B26D 5/12* | (2006.01) |
| *B26D 7/02* | (2006.01) |
| *B23D 15/14* | (2006.01) |
| *B26D 7/01* | (2006.01) |

(52) U.S. Cl.
CPC ............. *B26D 1/08* (2013.01); *B23D 21/00* (2013.01); *B23D 21/06* (2013.01); *B26D 3/16* (2013.01); *B26D 5/12* (2013.01); *B26D 7/02* (2013.01); *B23D 15/14* (2013.01); *B26D 2007/013* (2013.01); *Y10T 83/04* (2015.04); *Y10T 83/667* (2015.04); *Y10T 83/68* (2015.04); *Y10T 83/7513* (2015.04); *Y10T 83/8854* (2015.04); *Y10T 83/9454* (2015.04)

(58) Field of Classification Search
USPC .......... 83/743, 745, 54; 144/34.3, 34.5, 34.6, 144/339
IPC .................... B23D 21/00,57/0084; B26D 3/16, B26D 3/161, 2007/013
See application file for complete search history.

(56) References Cited

U.S. PATENT DOCUMENTS

| | | | | |
|---|---|---|---|---|
| 2,882,941 | A | * | 4/1959 | Pope ............................... 83/743 |
| 3,493,020 | A | * | 2/1970 | Choat ................... A01G 23/087 144/34.1 |
| 3,542,100 | A | * | 11/1970 | Choat .......................... 144/34.5 |
| 3,590,760 | A | * | 7/1971 | Boyd et al. ..................... 144/4.1 |
| 3,643,712 | A | * | 2/1972 | Doel et al. ................... 144/34.5 |
| 3,774,659 | A | * | 11/1973 | Bodine ........................ 144/34.1 |
| 4,175,598 | A | * | 11/1979 | Stoychoff .................... 144/34.1 |
| 4,313,479 | A | * | 2/1982 | Coughran, Jr. ................ 144/4.1 |
| 4,528,740 | A | * | 7/1985 | Sassak ........................... 29/516 |
| 6,439,089 | B1 | | 8/2002 | Fasske |
| 6,938,313 | B2 | * | 9/2005 | Viola et al. .................... 29/33 T |
| 2009/0188113 | A1 | | 7/2009 | McKeeth |

* cited by examiner

*Primary Examiner* — Kenneth E Peterson
(74) *Attorney, Agent, or Firm* — Roger D. Emerson; Emerson Thomson Bennett, LLC

(57) ABSTRACT

A cutting apparatus for columnar items such as metal pipes has a base frame that supports a movable cutting blade. At least one blade actuator is disposed between the blade and the frame to drive the blade back and forth between retracted and extended positions. First and second arms are pivotably connected to the frame and moveable between disengaged and engaged positions. An arm actuator is associated with each arm and drives each arm between the disengaged and engaged positions. A segmented collar engages the entire circumference of the columnar item being cut. The blade is supported by the frame and the arms during the cutting process while the collar supports the material of the columnar item adjacent the cut.

9 Claims, 17 Drawing Sheets

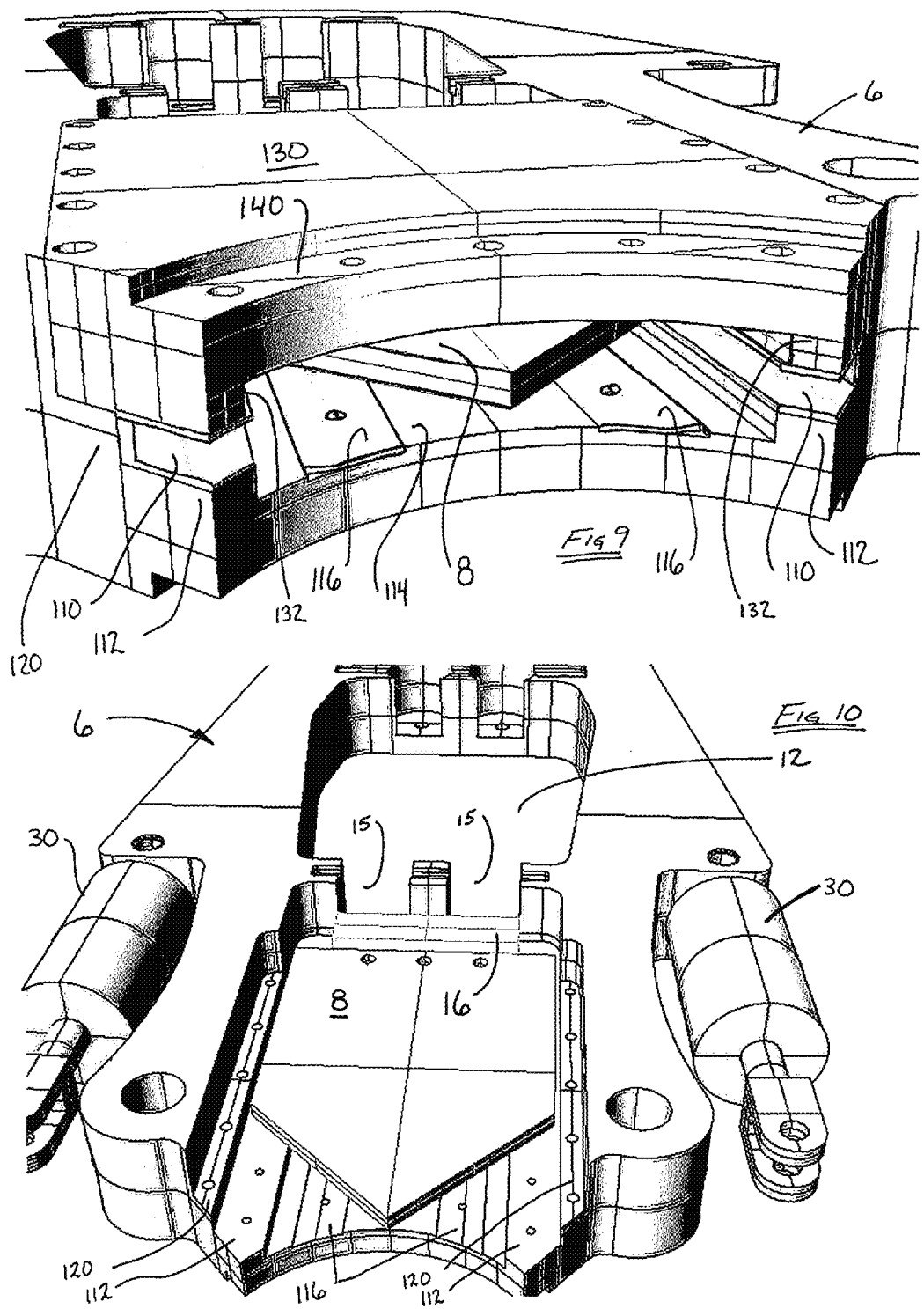

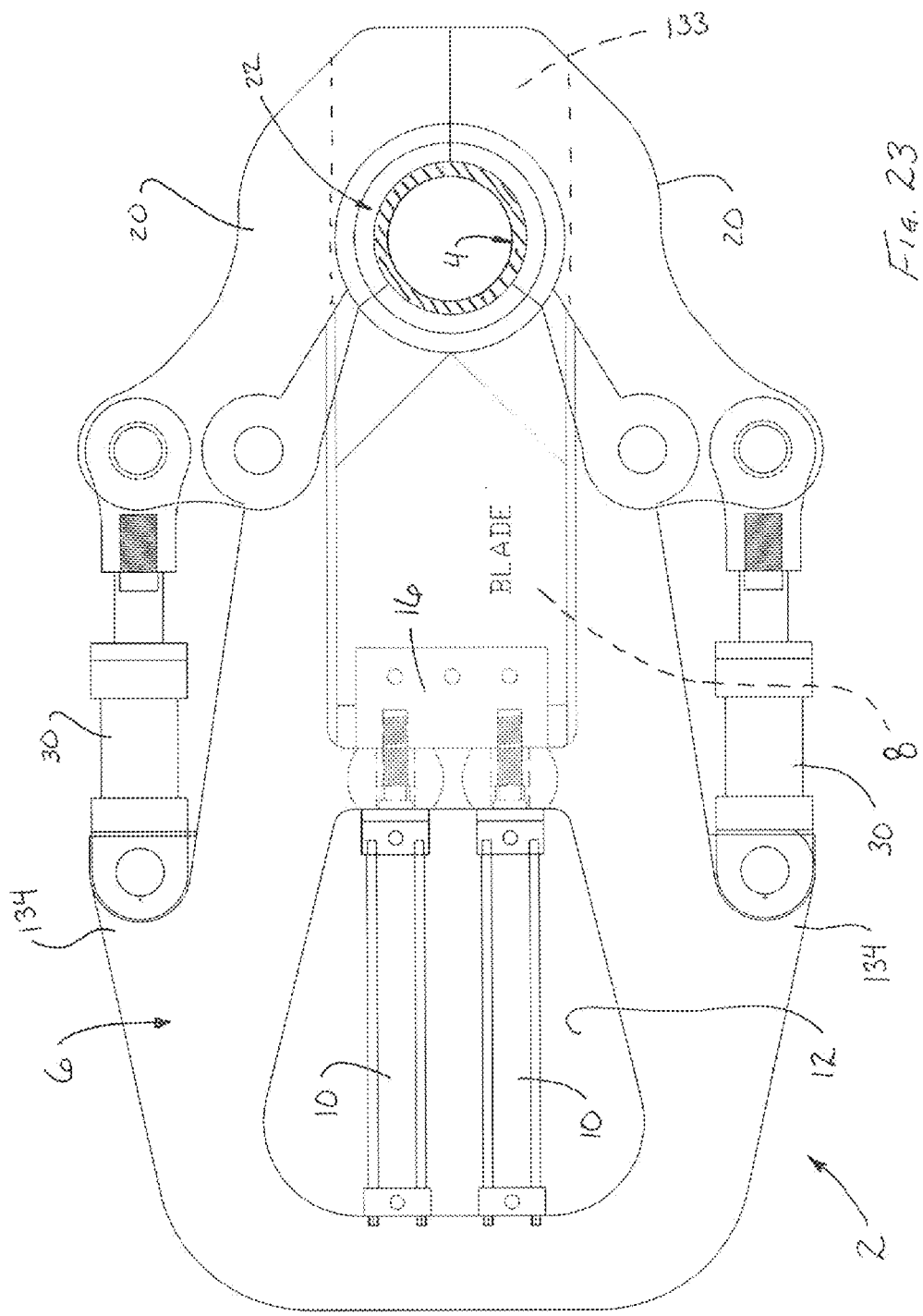

APPARATUS AND METHOD FOR CUTTING COLUMNAR ITEMS

CROSS REFERENCE TO RELATED APPLICATIONS

This application is a continuation of Ser. No. 12/505,487 filed Jul. 19, 2009, now abandoned, which claims the benefit of U.S. Provisional Application Ser. No. 61/081,913 filed Jul. 18, 2008 and claims the benefit of U.S. Provisional Application Ser. No. 61/158,214 filed Mar. 6, 2009; the disclosures of which are incorporated herein by reference.

BACKGROUND OF THE INVENTION

1. Technical Field

The invention generally relates to devices for cutting columnar items under water. More particularly, the invention relates to a cutting apparatus that is clamped around a portion of the columnar item during the cutting operation with a pair of arms that are both movable between disengaged and engaged positions.

2. Background Information

A variety of columnar items are disposed in various bodies of water throughout the world. These columnar items include solid columns manufactured from wood, concrete, or metal. The columnar items also include hollow pipes including sleeved pipes with a reinforcing material between the sleeves. Often, these columnar items must be removed below the waterline or below the sea floor or mud line. When these items are cut below the surface of the sea floor or below the mud line, the earth or mud must be removed to make room for the tool to operate. Those who perform this work want to remove as little earth or mud as possible. Another desired feature for these devices is that the moving parts of the device are maintained away from the human users in order to minimize risk of injury.

In some situations, those salvaging pipes want the cut end of the pipe to be substantially round so that the pipe end may be used for another application. In some prior art devices, the pipe is crushed to point that it cannot be reused. The crushing can occur when the areas of the pipe immediately adjacent to the cutting action is left unsupported.

SUMMARY OF THE INVENTION

The invention provides an apparatus for cutting columnar items wherein a pair of movable arms secure the apparatus to the columnar item before and during the cutting operation. The arms are then disengaged from the columnar item so the apparatus may be moved to a different location and reused.

The invention provides an apparatus for cutting columnar items wherein the arms that clamp the apparatus to the item are powered remotely.

The invention provides a cutting apparatus and a method for cutting columnar items wherein arms clamp the cutting apparatus to the item support the cutting apparatus on the item being cut. At the same time, the arms support the item being cut entirely about the outer circumference of the item immediately adjacent the cutting location to minimize deformation of the item being cut.

The invention provides an apparatus for cutting underwater columnar items wherein the clamping arms require little space on the side of the columnar item opposite the blade. The arms grip the item from both sides of the item to secure the apparatus for the cutting operation.

The arms may be held in place with hydraulic actuators that pivot the arms between their disengaged and engaged positions.

The invention provides adjustable arm configurations for different diameter items. The arms are provided with removable and replaceable upper and lower segmented collars.

The invention provides arms that define a blade slot such that the lateral edges of the blade are surrounded by the arms when the blade is extended.

The invention provides a blade chamber that supports the blade while allowing gaps above and below the blade.

In one configuration, the invention provides an apparatus for cutting a columnar item having an outer diameter wherein the apparatus includes a frame and a pair of arms having outer end portions with each of the arms being movable between disengaged and engaged positions. Each of the arms having a portion of a support band; the portions of the support band cooperating together when the arms are in the engaged position to engage and support a circumferential portion of the columnar item adjacent the location where the columnar item will be cut. The outer end portions are spaced apart a distance greater than the outer diameter of the columnar item to be cut when the arms are in the disengaged position. An arm actuator is associated with each arm; each arm actuator configured to move the arm back and forth between the disengaged and engaged positions. The arm actuators are adapted to apply a clamping force to the arms in the engaged position. A blade is carried by the frame with a blade actuator associated with the blade; the blade actuator being adapted to move the blade between retracted and extended positions.

In another configuration, the invention provides a cutting apparatus having a base frame that supports a movable cutting blade. The blade moves back and forth in a pair of opposed channels defined by the frame. At least one blade actuator is disposed between the blade and the frame to drive the blade back and forth between retracted and extended positions. First and second arms are pivotably connected to the frame and moveable between disengaged and engaged positions. An arm actuator is associated with each arm and drives each arm between the disengaged and engaged positions. Each actuator is pivotably connected to the frame and pivotably connected to the inner end of an arm. Each arm is pivotably connected to the frame inwardly of the connection between the arm and the actuator. The outer ends of the arms and a portion of the frame define a 360 degree sectioned collar that engages the columnar item. The blade passes above, below, or through the frame portion of the collar to engage the columnar item. The collar portions of the arms may define slots that receive the blade as the blade cuts through the columnar item.

The invention also provides a method of cutting a columnar item having an outer diameter wherein the method includes the steps of: opening arms of a cutting apparatus to a disengaged position wherein the outer ends of the arms define an opening that is larger than the outer diameter of the columnar item to be cut; each of the arms having a curved support band portion; moving the arms of the apparatus to opposite side of the columnar item; closing the arms to their engaged position to engage the curved support band portions of the arms with the outer surface of the columnar item to clamp the cutting apparatus to the columnar item; and moving a blade through the columnar item.

BRIEF DESCRIPTION OF THE DRAWINGS

FIG. 9 is an enlarged perspective view showing how the blade is held in position with the blade cover plate attached.

FIG. 10 is perspective view of the blade without the lateral guides.

FIG. 23 is a top plan view showing the cutting apparatus clamped onto a hollow pipe.

Similar numbers refer to similar parts throughout the specification.

DETAILED DESCRIPTION OF THE INVENTION

Figure 1:
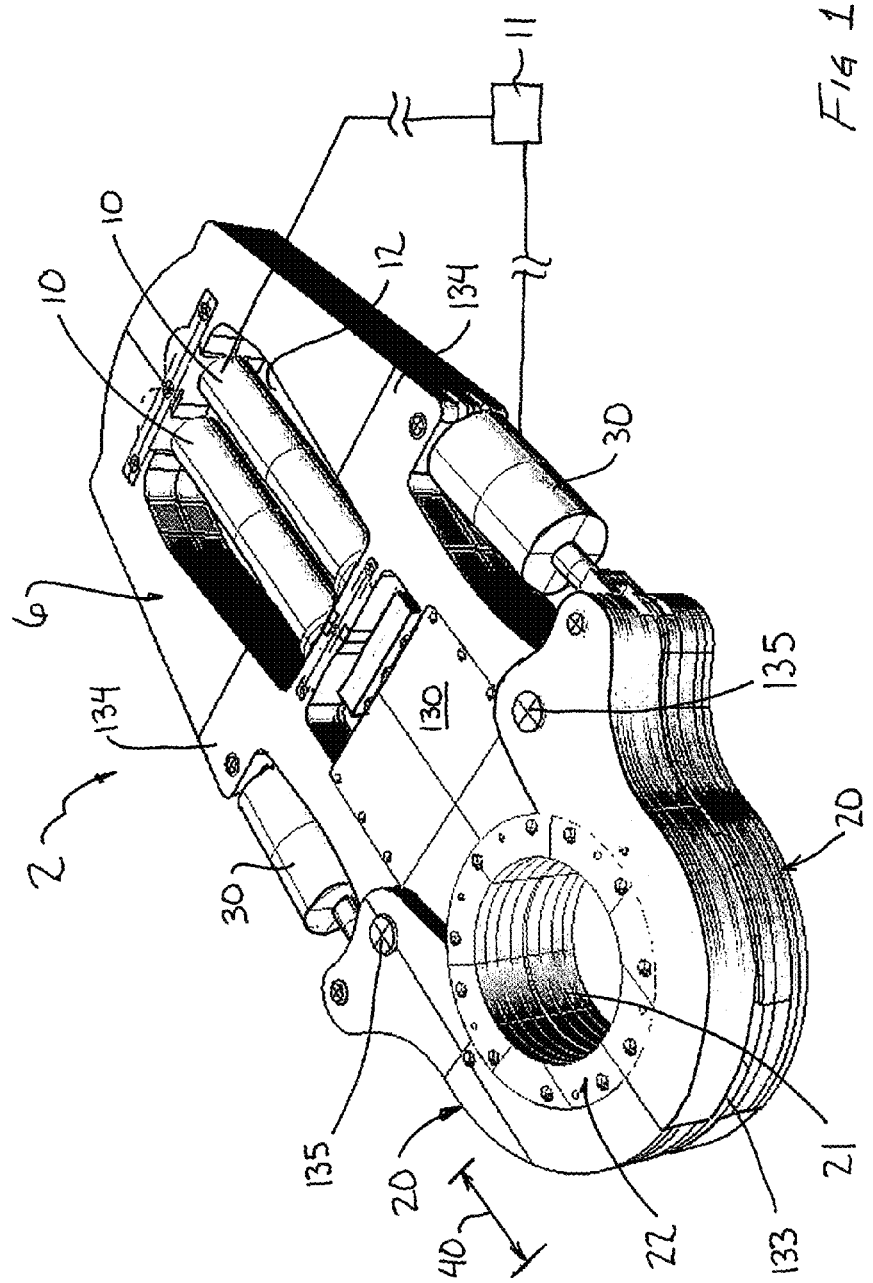
FIG. 1 is a top perspective view of the entire cutting apparatus with the arms in the closed or engaged positions.
Figure 2:
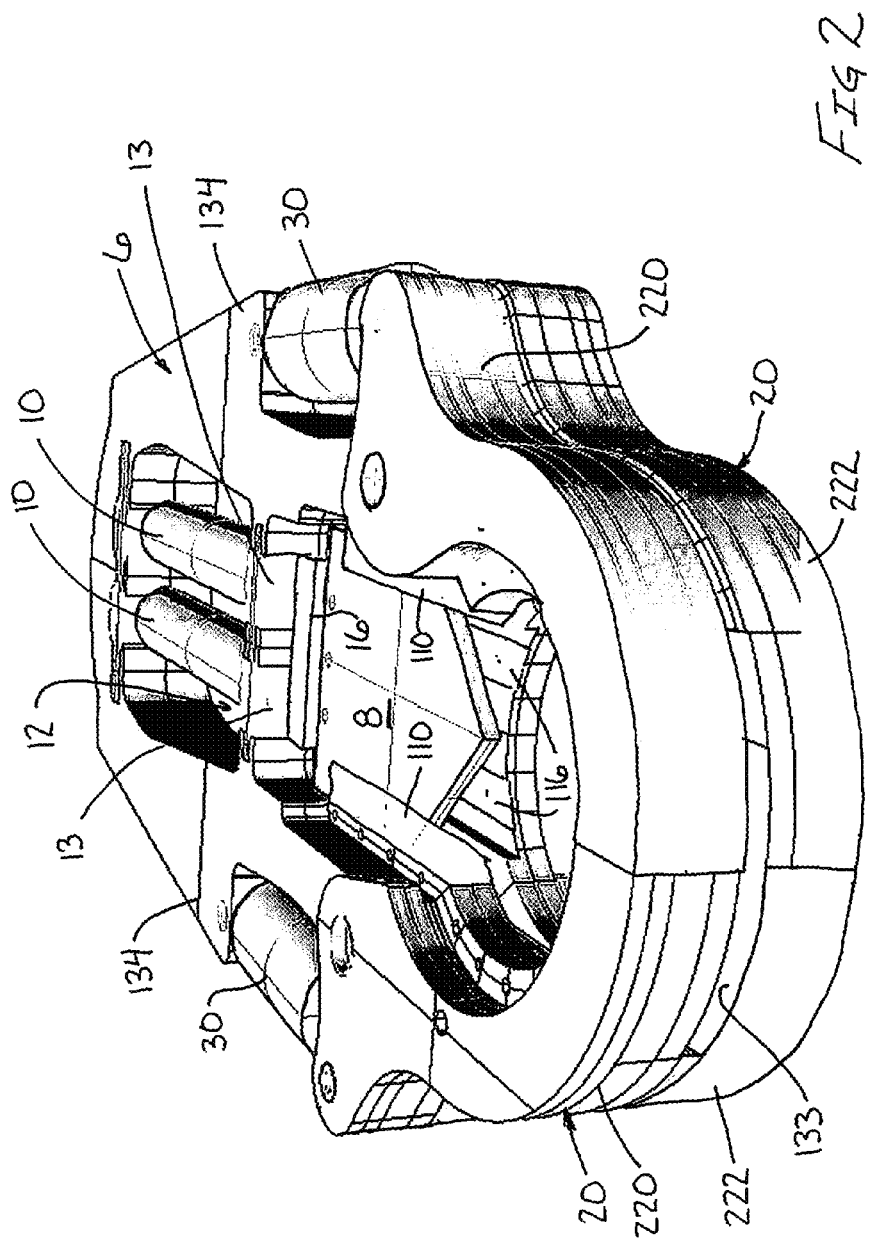
FIG. 2 is a perspective view showing the cutting blade with the blade cover plate and upper segmented collar removed.

An exemplary configuration of the cutting apparatus of the invention is indicated generally by the numeral 2 in the accompanying drawings. Apparatus 2 is used to cut through a columnar item 4 such as a solid column or a hollow pipe. Apparatus 2 may be used to cut through or crush a variety of columnar items by pushing its blade 8 directly through the item or by repeatedly driving blade 8 against and through the item. Apparatus 2 is configured to function below a waterline so that the item may be cut off at or below the sea floor. Apparatus 2 is designed to cut items by supporting the entire circumference of the item both above and below (immediately adjacent) the area of item acted on by blade 8. Supporting the item in this manner minimizes the crushing of the ends.

Apparatus 2 includes a frame 6 that carries blade 8 between retracted and extended positions. Various blade configurations may be used. The exemplary configuration is a generally rectangular blade having a single pointed end that initially engages the wall of the item to be cut. At least one blade actuator 10 is anchored to frame 6 and is connected to blade 8. When multiple blade actuators 10 are used, they are configured to evenly apply force to blade 8. Blade actuator 10 may be a hydraulic piston-cylinder actuator that is driven back and forth with pressurized hydraulic fluid supplied by a hydraulic fluid supply device 11 such as a pump that may be located at a location remote from apparatus 2. The movement of blade 8 may be controlled remotely so that people do not have to be near apparatus 2 during the cutting operation. Blade actuator 10 selectively moves blade 8 back and forth between the retracted and extended positions. In the context of this application, the term actuator also encompasses a pair of devices that function together as an actuator that moves an element back and forth between two positions. In the exemplary configurations, each actuator is capable of both pushing and pulling. In other configurations, the actuator may include one device for pushing and a separate device for pulling.

Figure 3:
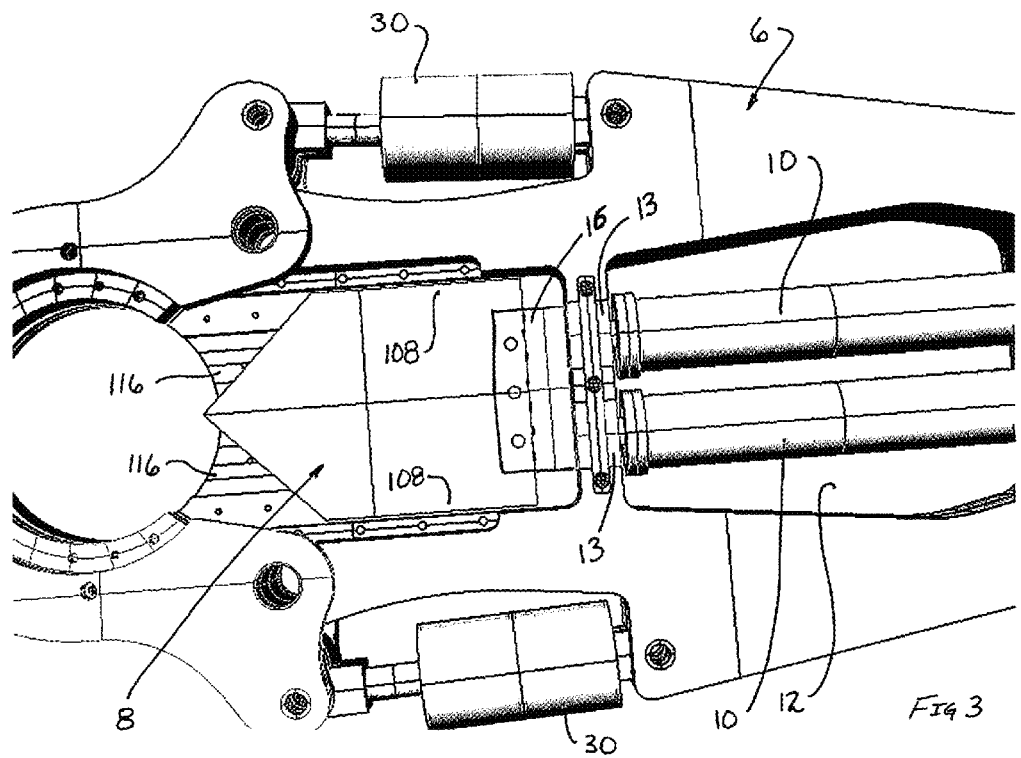
FIG. 3 is a top plan view of the cutting blade.
Figure 4:
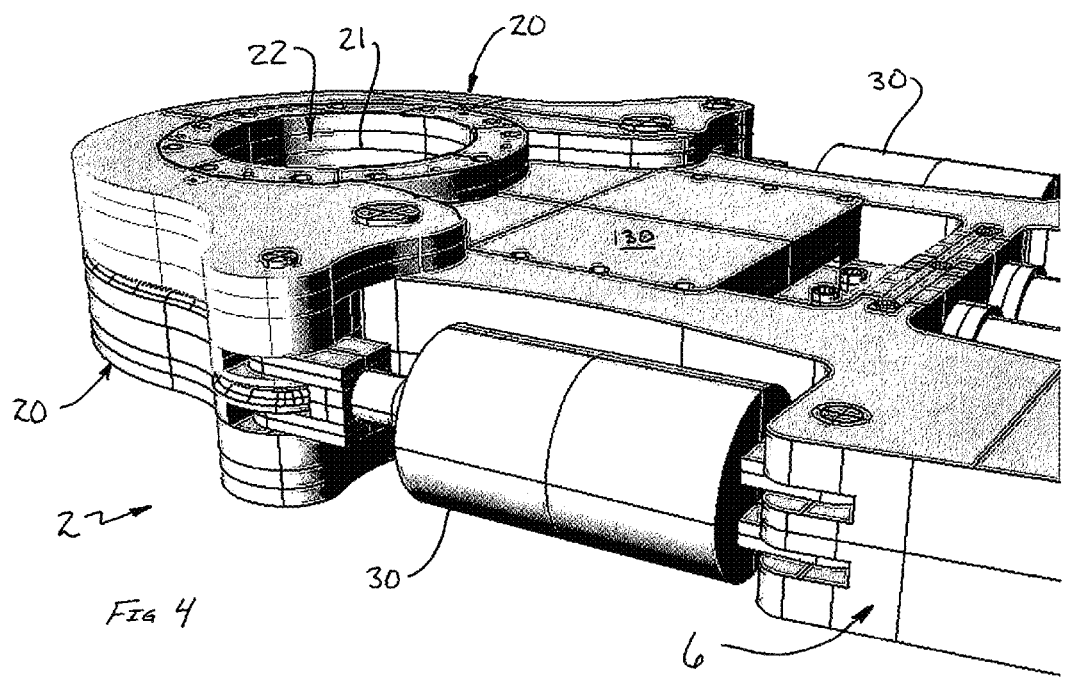
FIG. 4 is a side perspective view of the cutting apparatus.
Figure 5:
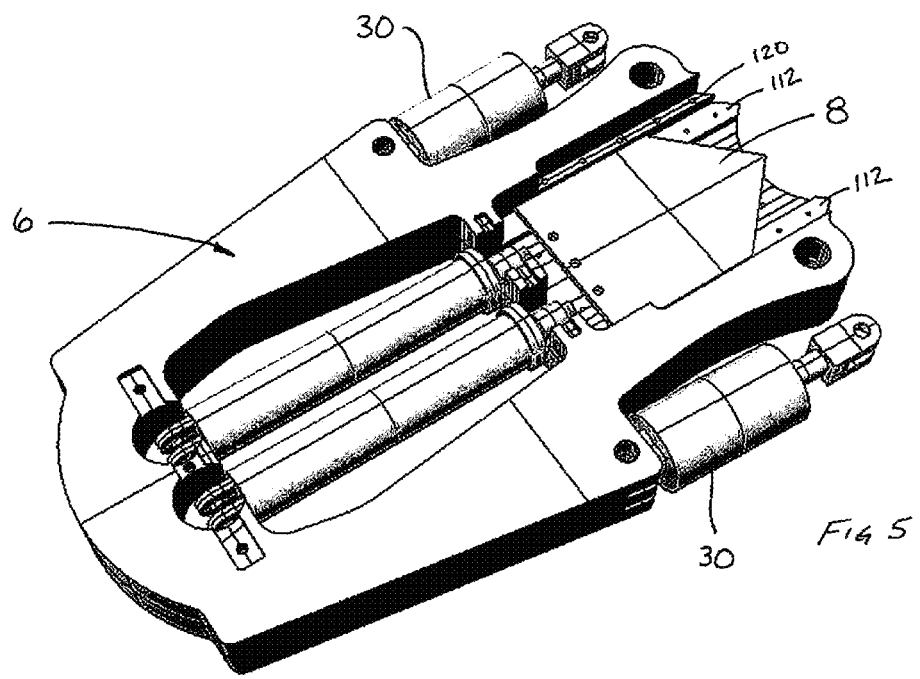
FIG. 5 is perspective view of the cutting apparatus with the arms removed and showing the cutting blade.
Figure 6:
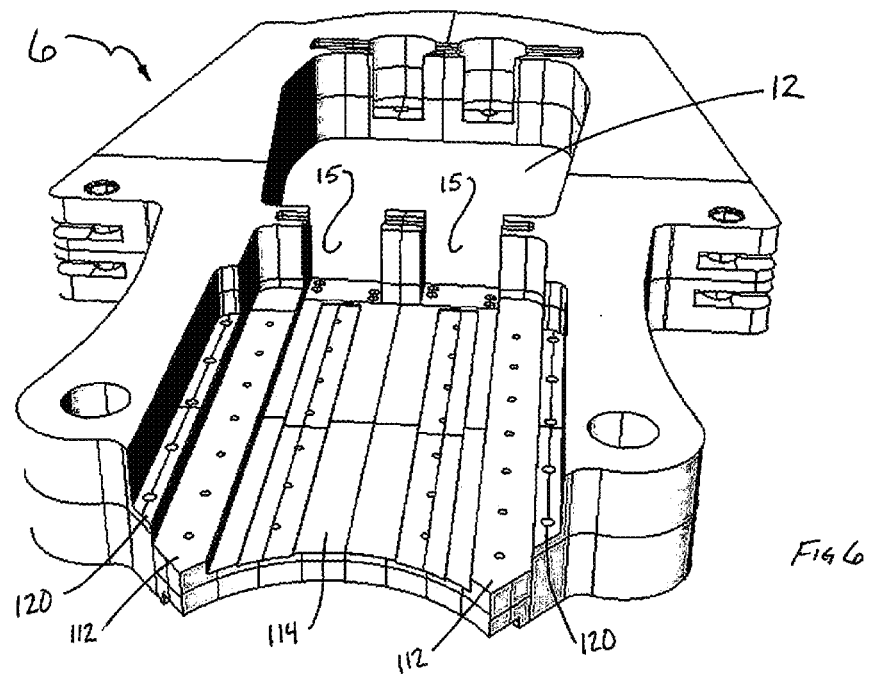
FIG. 6 is perspective view of the frame that supports the cutting blade.
Figure 12:
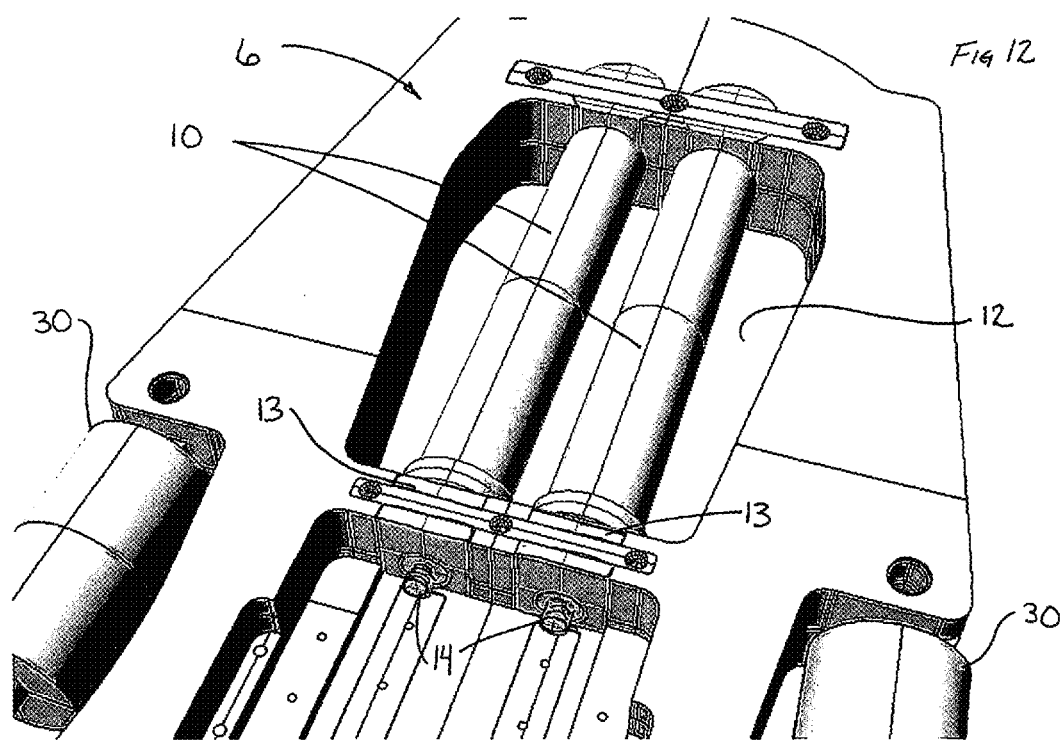
FIG. 12 is perspective view similar to FIG. 11 with the blade removed.
Figure 13:
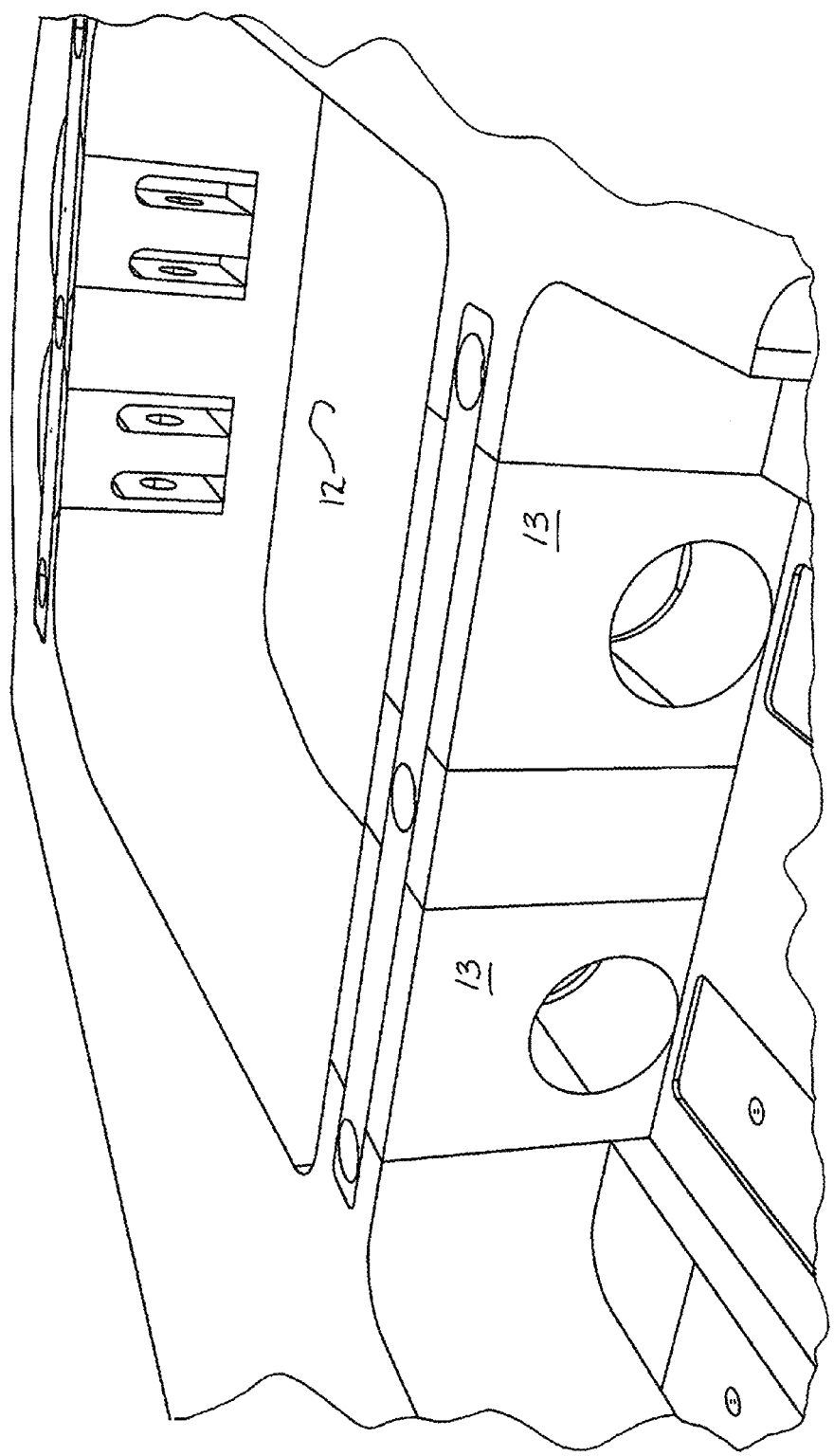
FIG. 13 is an enlarged perspective view showing the portion of the frame that supports the blade actuators.
Figure 14:
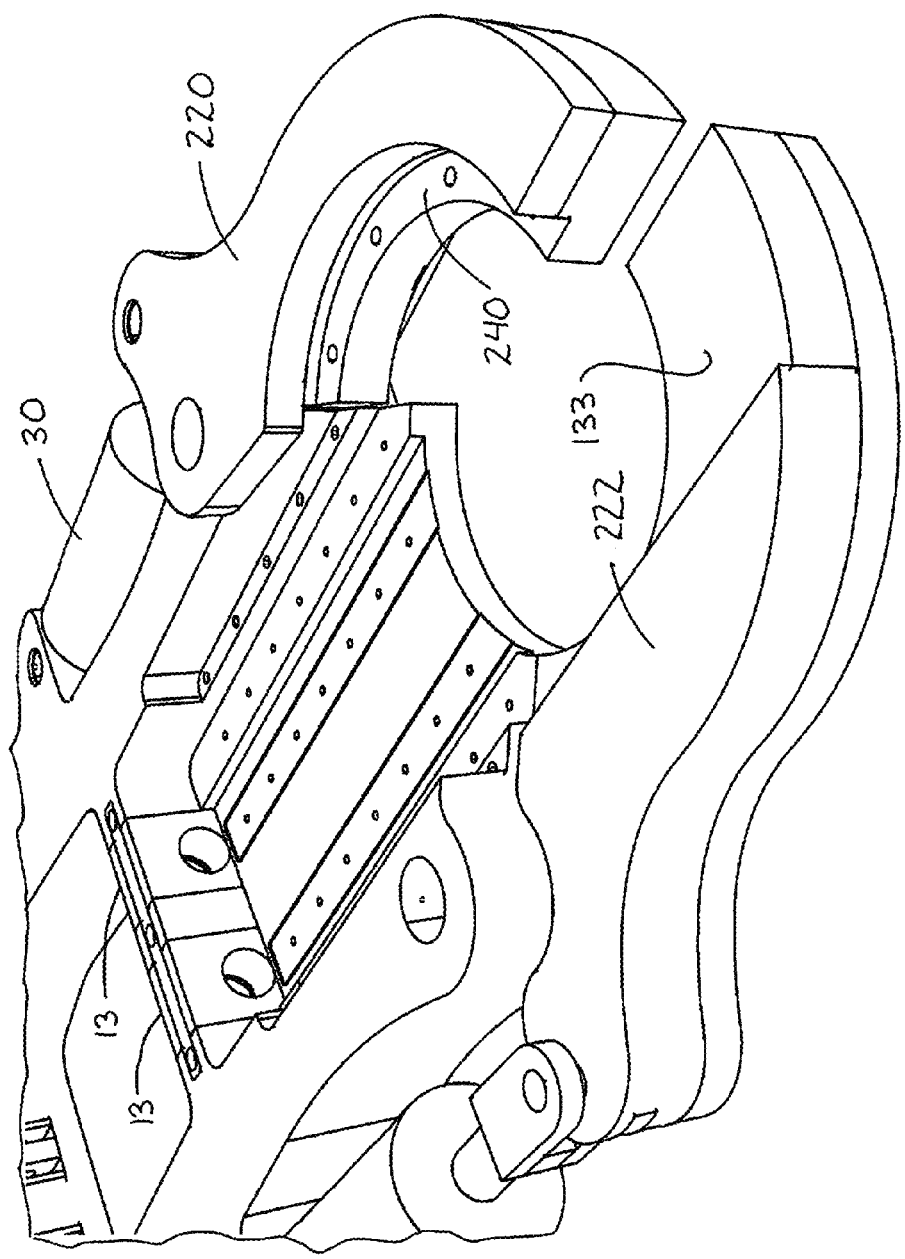
FIG. 14 is a perspective view of the front of the cutting apparatus with upper portion of arm on the left removed and the lower portion of the arm on the right removed.

In the exemplary configuration, frame 6 defines a recess or an opening 12 that receives a pair of blade actuators 10 in the form of hydraulically-driven piston cylinders that push blade 8 outwardly and can also pull blade 8 back inwardly. The cylinders are secured to the rear portion of frame 6 while the piston rods pass through wear bushings 13 removably carried in openings 15 defined by frame 6. The piston rods are connected to a blade mount 16 that is connected to the rear end of blade 8. Threaded connectors 14 may be used to connect the piston rods to blade mount 16 as shown in FIG. 12. Other connectors may be used to secure the piston rods to blade 8. This mounting configuration aligns actuators 10 with blade 8 so that the pushing force of actuators 10 is aligned with blade 8. Blade mount 16 may be L-shaped with one portion extending across the top of the rear of blade 8 where it is secured in place with bolts as shown in FIGS. 3 and 23. Other blade mounts 16 may be used such as one that is C-shaped. In other configurations, mount 16 may be integral with blade 8 such that the piston rods are connected directly to blade 8.

The lateral edges 108 of blade 8 are supported in a pair of opposed lateral guides 110. Guides 110 may be provided in single C-shaped pieces or through the assembly of a plurality of pieces. In the exemplary configuration, the bottom and outer edge of guide 110 is formed as an L shaped member that is bolted down against a guide block 112 defined by frame 6. The upper wall of guide 110 formed independent and is connected to the blade cover plate 130 that rests over the top of blade 8 as shown in FIG. 9. Each guide 110 defines a rectangular opening sized to slidably receive one of lateral edges 108 as shown in FIGS. 2, 8, 9 and 20. The rectangular openings face each other across the chamber that receives blade 8. Guides 110 are fabricated from a material that is designed to wear out faster than blade 8 or frame 6 so that guides 110 will absorb the wear instead of the other elements of apparatus 2.

Guides 110 are supported from below by guide blocks 112 defined by frame 6. Blocks 112 lift the lower portion of guides 110 to a position spaced from the floor 114 of a blade chamber to provide space between the bottom surface of blade 8 and the portion of frame 6 that defines the bottom of the blade chamber. Guides 110 are bounded laterally by lateral blocks 120 that receive the lateral edges of a blade cover plate 130.

As shown in FIG. 9, wear plates 116 are carried by body 6 at the bottom of the blade chamber. Blade holder 16 slides back and forth on wear plates 116. Wear plates 116 prevent frame 6 from wearing out as blade holder slides back and forth over frame 6.

Blade cover plate 130 includes its own guide blocks 132 that define a space between the upper surface of blade 8 and the lower surface of plate 130. Blade cover plate 130 is bolted down to frame with connectors that extend down through the lateral edges of plate 130 into lateral blocks 120.

Figure 7:
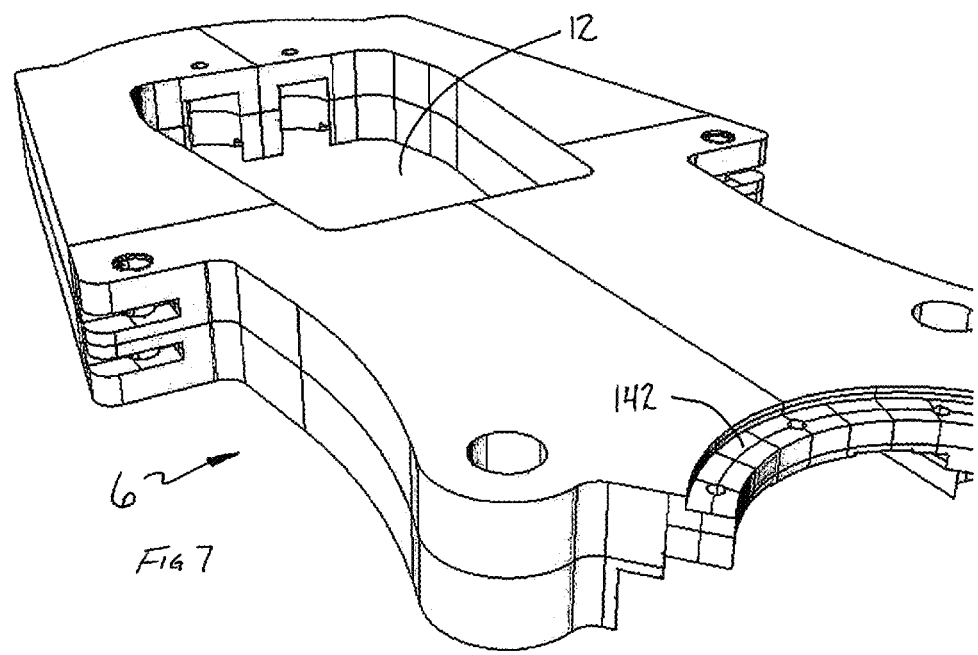
FIG. 7 is a bottom perspective view of the frame.
Figure 8:
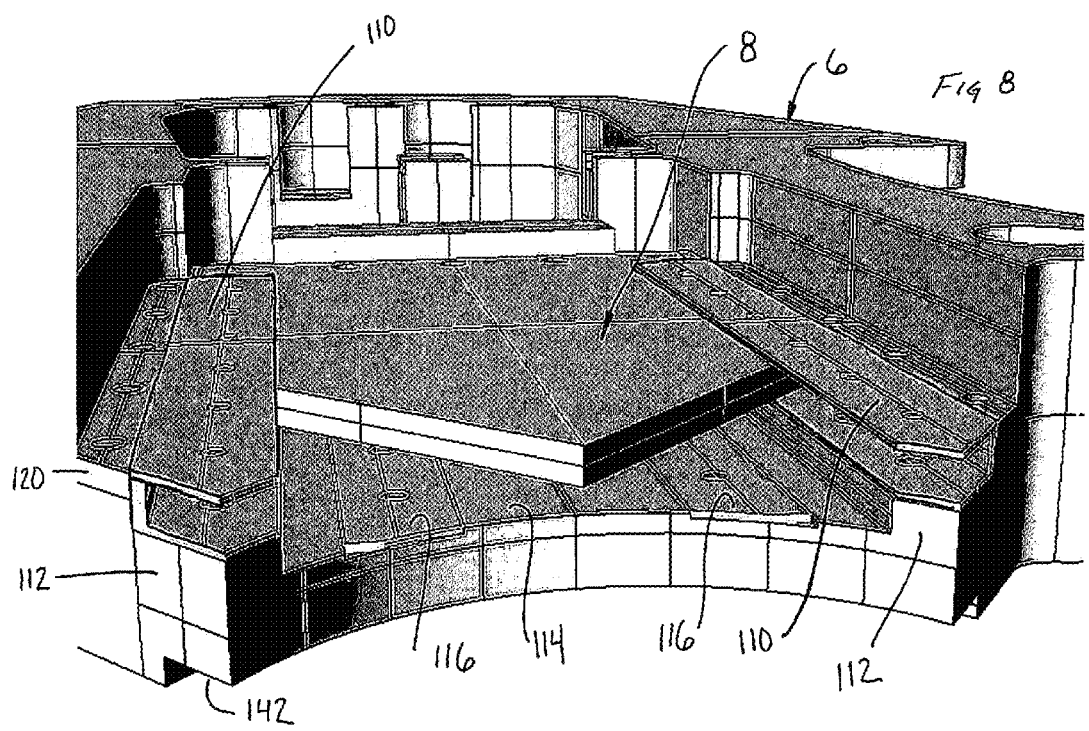
FIG. 8 is an enlarged perspective view showing how the blade is held in position with the lateral guides.
Figure 11:
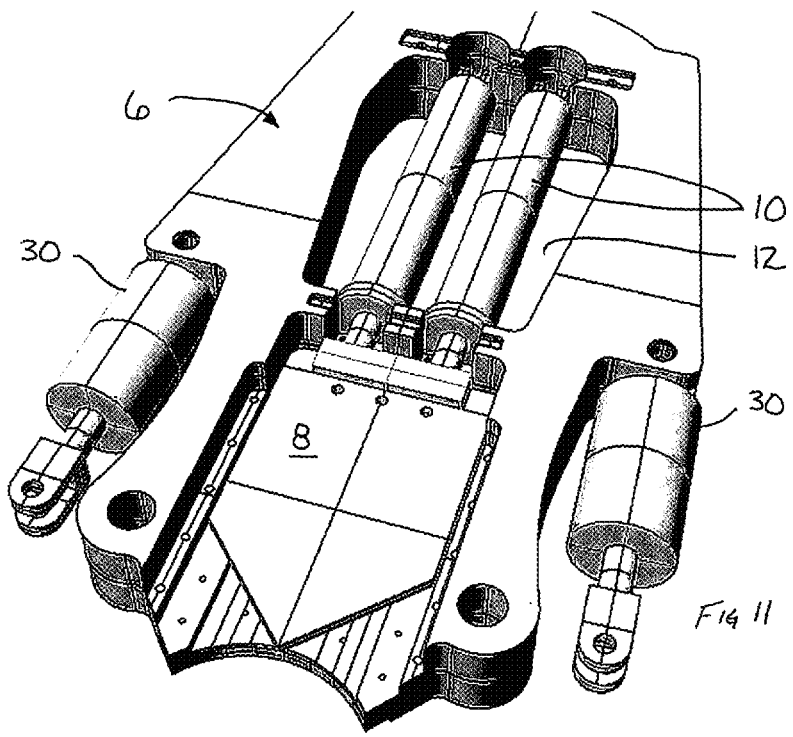
FIG. 11 is perspective view similar to FIG. 10 showing the blade actuators.

The front edge of blade cover plate 130 defines an upper recessed frame arc 140. A lower recessed frame arc 142 is defined by frame 6 as shown in FIG. 7. Frame arc 142 essentially mirrors arc 140.

The rear of blade cover plate 130 may be configured to provide access to the rear of blade 8. This opening allows water to flow freely into and out of the blade chamber when blade 8 is moving back and forth during use. Access to the end of blade 8 also allows the connections between blade 8 and blade holder 16 to be checked or tightened without removing cover plate 130.

Apparatus 2 includes a pair of arms 20 that are configured to clamp around item 4 to support apparatus 2 from item 4 before, during, and after the cutting process. Arms 20 include inwardly-facing support band portions 21 configured to match the outer surface of item 4. Support band portions 21 of arms 20 that engage item 4 are defined by a removable segmented collar 22 that is carried by arms 20. Collar 22 allows the diameter of the support band to be changed for different items 4.

Arms 20 are pivotably mounted to frame 6 at arm pivot mounts 135 which are disposed on opposite sides of blade 8 or the blade chamber. Arm pivot mounts 135 may be pins. Arms 20 are movable between disengaged (FIG. 21) and engaged (FIG. 1) positions. Arms 20 are aligned with blade 8 such that the reference plane that contains blade 8 passes through the outer ends of arms 20. Arms 20 cooperate to define a blade slot 133 that receives blade 8 when blade 8 is in the extended position. The blade slot defined by arms 20 is aligned with lateral guides 110 when arms 20 are in the engaged position depicted in FIG. 1. The blade slot may extend entirely through the outer ends of arms 20 as shown in FIGS. 1, 2, 14, 15, 17, 18, 19, and 20.

Figure 15:
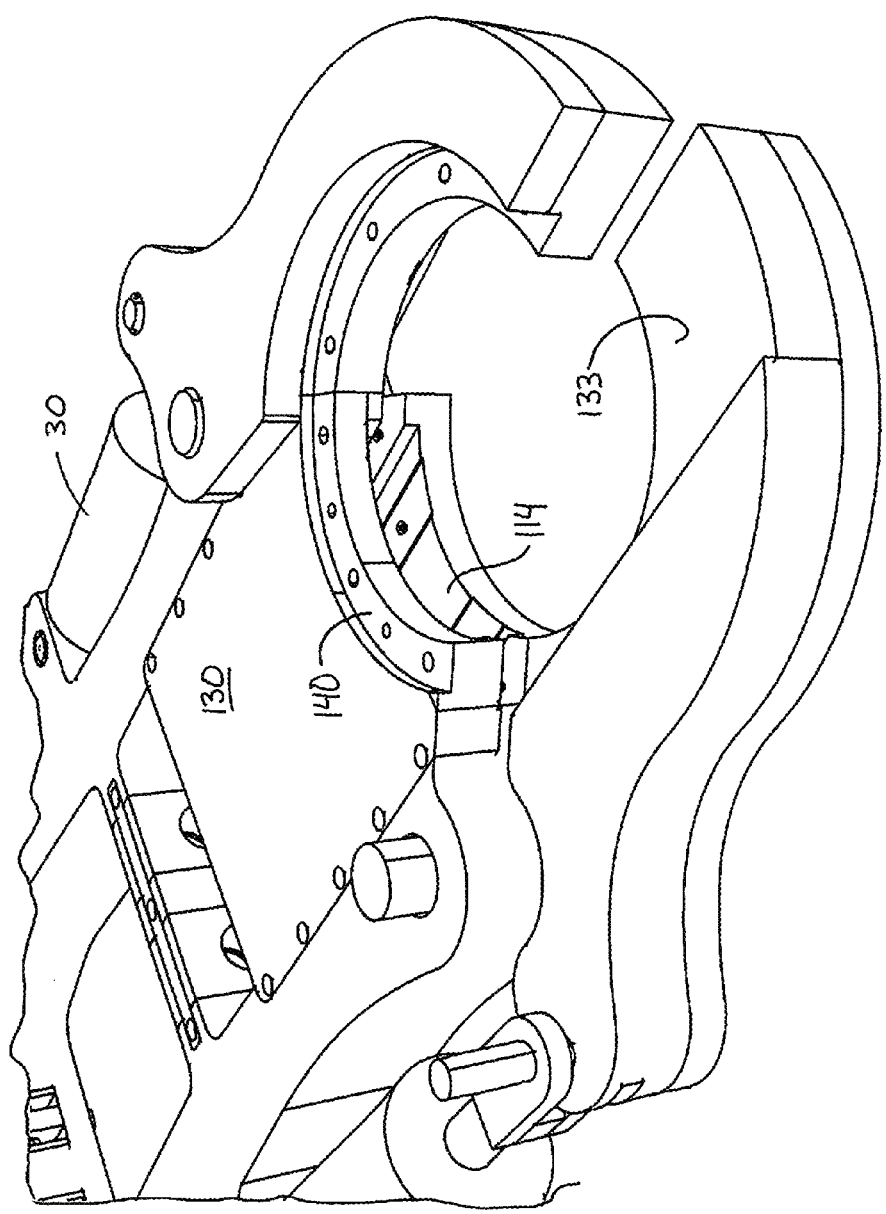
FIG. 15 is a view similar to FIG. 14 showing the pins that connect the arms to the frame.
Figure 16:
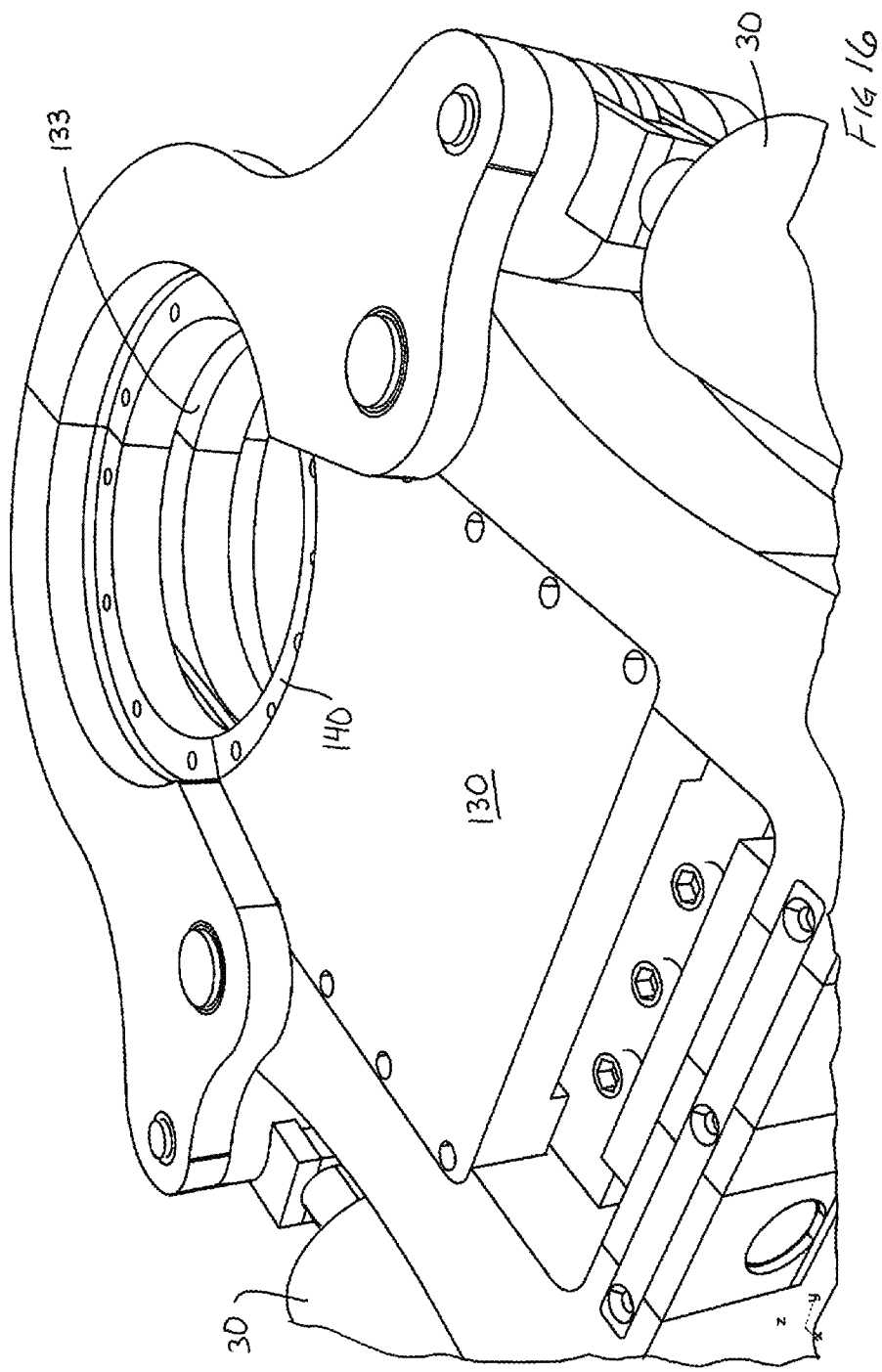
FIG. 16 is a perspective view showing the complete arms and the blade cover plate.
Figure 17:
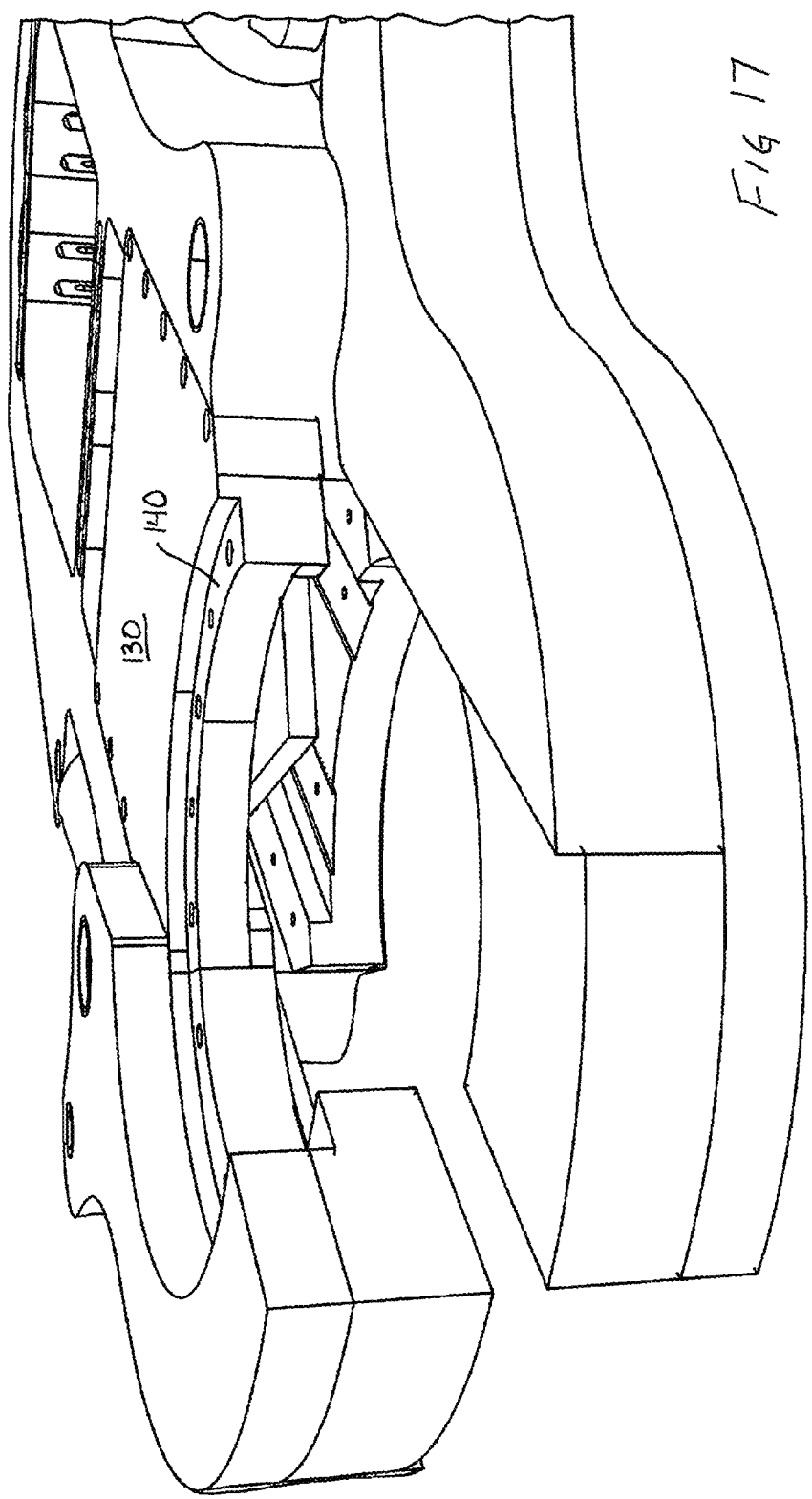
FIG. 17 is a front perspective view showing the arm structure.
Figure 18:
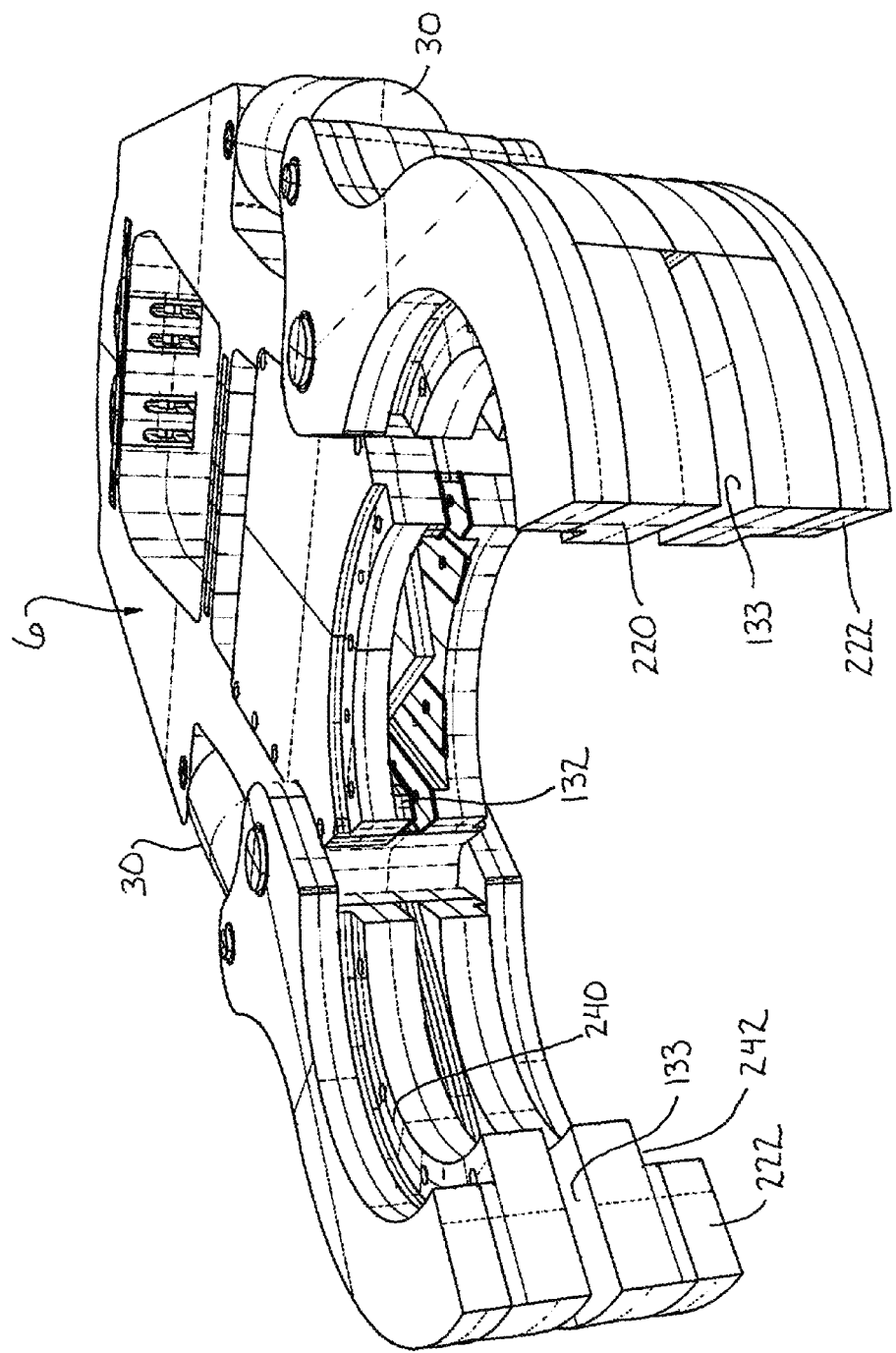
FIG. 18 is a front perspective view with the arms in the disengaged position.
Figure 19:
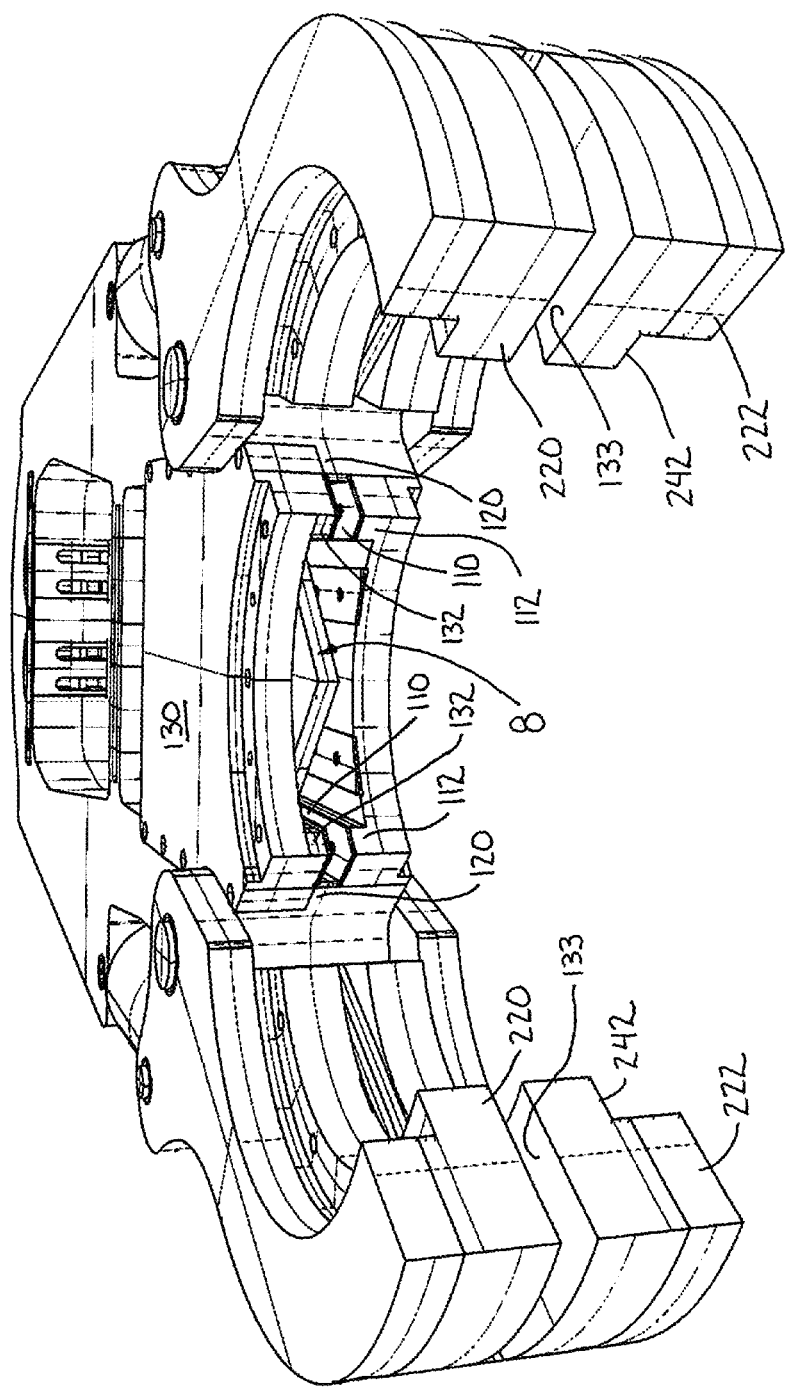
FIG. 19 is a view similar to FIG. 18.
Figure 20:
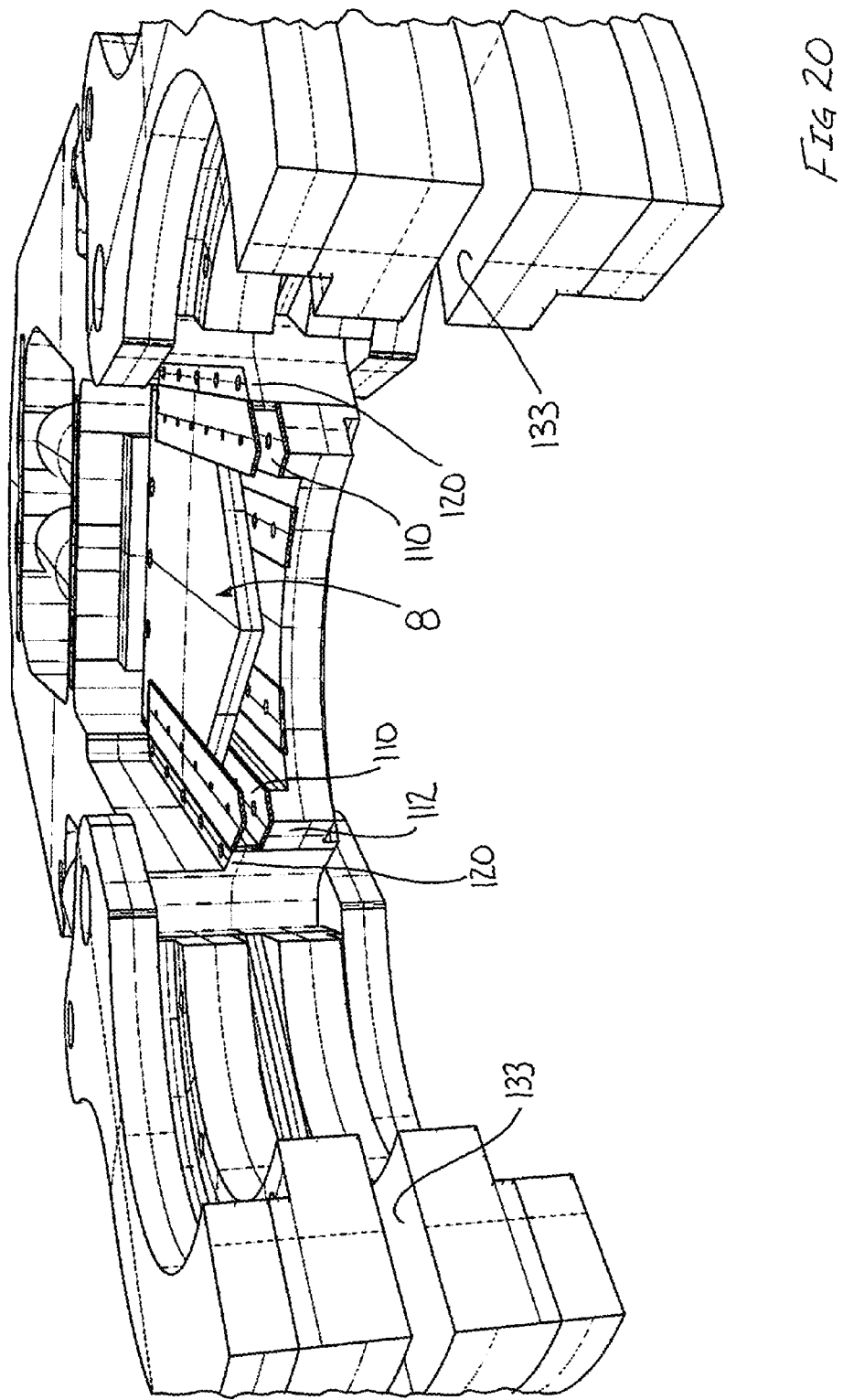
FIG. 20 is a view similar to FIG. 19 showing the blade cover plate removed.

Each arm 20 is formed by cooperating upper 220 and lower 222 arm portions. Upper and lower arm portions may be secured together such as by connectors or by welding to prevent the upper and lower portions from spreading apart during use. When welds are used to hold arm portions 220 and 222 together, the outer lateral inner edges of portions 220 and 222 may be tapered inwardly to provide room for the weld as shown in FIGS. 15 and 17.

Upper arm portions 220 define a recessed arc 240 and lower arm portions 222 define a recessed arc 242. When arms 20 are in the engaged position, arcs 240 cooperate with arc 140 to define a recessed ring and arcs 242 cooperate with arc 142 to define upper and lower recessed rings. The outer end of each arm 20, blade cover plate 130, and frame 6 carry removable segmented collar 22 having portions disposed in each of the recessed rings such that there is an upper segmented collar aligned with a lower segmented collar. Segmented collar 22 is configured to engage the columnar item 4 to clamp apparatus 2 to item 4 before, during, and after the cutting process. When arms 20 are in the engaged position as shown in FIG. 1, segmented collar 22 defines a cylinder (having a blade slot) that is adapted to completely surround and engage the outer circumference of the columnar item to be cut. Collar 22 acts as a pair of pressurized support bands disposed above and below the area of item 4 being cut by blade 8. This engagement supports apparatus 2 from item 4 before blade 8 engages item 4. Collar 22 engages the entire circumference of item 4 immediately above and below blade slot 133 and thus supports the sections of item 4 immediately adjacent the cut or material removal. Supporting the areas in this manner during the cutting process results in smoother ends and less crushing than an unsupported cutting or crushing process.

Each individual collar segment is L-shaped and sized to be carried in a portion of the recessed rings. The individual collar segments are removable and replaceable so that apparatus 2 may be configured for different diameter columnar items to be cut. The ends of collar segments may be stepped so that they overlap or interlock to provide strength and stability to apparatus 2 when arms are in the engaged position clamping apparatus to columnar item 4. The individual segments are bolted to the arms 20, frame 6, or blade cover plate 130.

Figure 21:
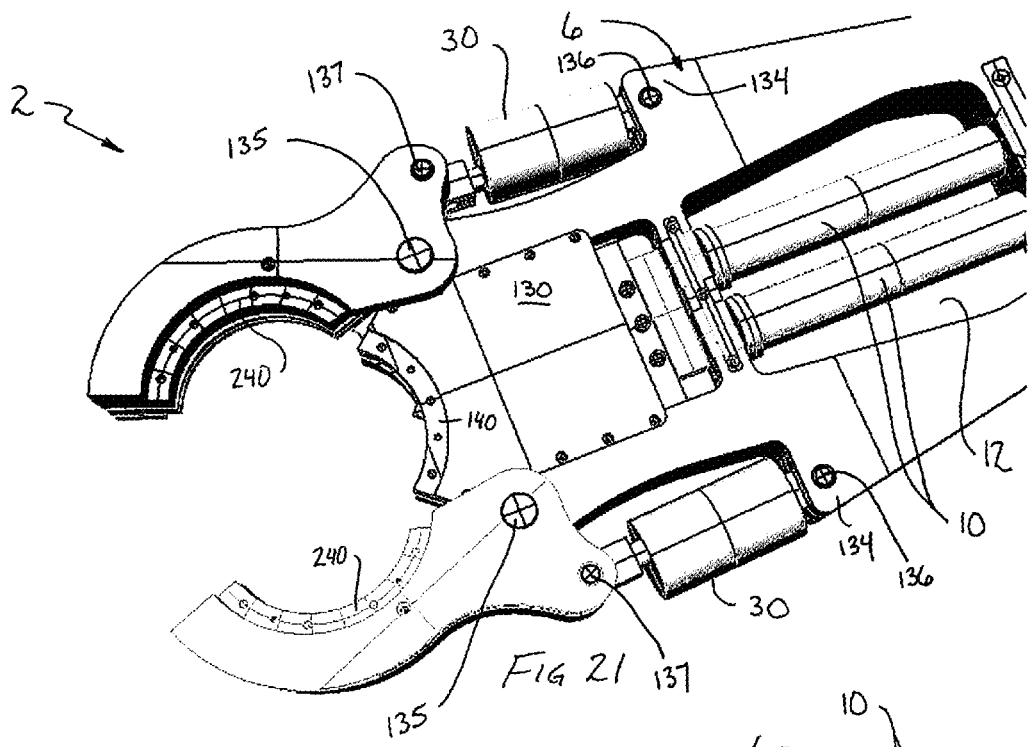
FIG. 21 is a top view showing the cutting apparatus.
Figure 22:
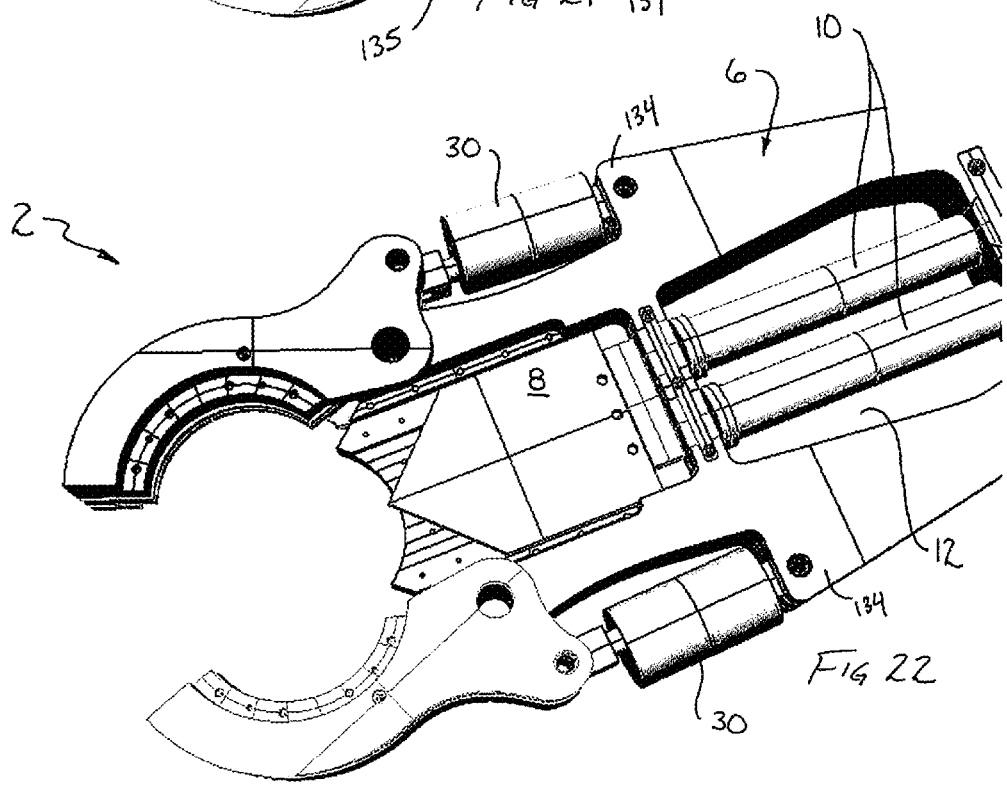
FIG. 22 is a view similar to FIG. 21 showing the blade cover plate removed.

Apparatus 2 includes at least one arm actuator 30 configured to move each arm 20 between the disengaged and engaged positions. Each arm actuator 30 may be a hydraulic piston cylinder capable of being operated remotely and powered from supply 11. As shown in FIGS. 1 and 21, the inner end or rear end of actuator 30 is pivotably connected at a pivot mount 136 to a shoulder 134 of frame 6 and the outer end or forward end of actuator 30 is pivotably connected to the inner end of arm 20 at a pivot mount 137. In the exemplary configuration, the piston rod is connected to arms 20 but actuator can be reversed so that the piston rod is connected to frame 6. Pivot mount 137 is spaced from pivot mount 135 by a distance that, if increase, will increase the holding force of arms 20 when actuators 30 are applying a holding force. The specific distance may be varied depending on the size of arms 20 and the size of actuators 30. In some configurations, pivot mounts 135, 136, and 137 are located such that a right angle is formed between the three mounts when arms 20 are in the engaged position as shown in FIGS. 1 and 23. In this configuration, pivot mounts 135 and 137 are disposed along a reference line disposed substantially perpendicular to the direction of movement for blade 8 (blade direction) when arms 20 are engaged. When arms 30 are in the disengaged position, pivot mounts 137 are disposed rearwardly of pivot mounts 135. The connections 135 between arms 20 and frame 6 are disposed outwardly of blade 8 so that a portion of blade 8 passes between these connections as blade 8 moves between the disengaged and engaged positions. The arm/frame 135 and arm/actuator 137 connections are all disposed on the frame side of item 4 to be cut such that item 4 to be cut is disposed intermediate the connections 135, 137 and the outer end portions of arms 20.

Arms 20 are configured such that their outer end portions move inwardly toward each other to engage item 4 from the sides like a pair of hands cupping item 4 from the sides. Arms 20 are maintained in the engaged position through the force of actuators 30 because the outer end portions are not locked together with a connector such as a pin or a bolt. This configuration allows apparatus 2 to be clamped around item 4 without the need for a worker to be on the side of item 4 opposite frame 4 thus increases safety and making apparatus 2 easy to use. This arm configuration is also beneficial to those applications wherein apparatus 2 is being used in tight spaces such as beneath the mud line or sea floor where working space is limited. Apparatus 2 requires clearance behind the item 4 to be slightly greater than the length (indicated by reference numeral 40 in FIG. 1) of the outer end portions of arms 20.

Apparatus 2 is used to cut item 4 by opening arms 20 to their disengaged position wherein the outer end portions of arms 20 define an opening that is larger than the outer diameter of the columnar item to be cut. The user then moves apparatus 2 onto columnar item 4 so that arms 20 are moved onto opposite side of columnar item 4. The user then closes the arms to their engaged position to clamp the cutting apparatus to the columnar item. Pressure is applied by the arm actuators to provide a clamping force to the arms while the apparatus is used to cut the item. Once positioned and clamped to item 4, the user activates the blade and moves the blade through the columnar item.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described.

The invention claimed is:

1. An apparatus for shearing a columnar item having an outer diameter, the apparatus comprising:
    a frame;
    a pair of arms having outer end portions; each of the arms being movable between disengaged and engaged positions;
    each of the arms and the frame defining portions of a support band; the portions of the support band cooperating together when the arms are in the engaged position define a pair of spaced circumferential support bands disposed above and below the location where the columnar item will be sheared; wherein each circumferential support band is formed from a plurality of removable collar segments, and some of the removable collar segments are carried by the arms and some of the removable collar segments are carried by the frame, and each support band is adapted to surround a portion of the columnar item in a substantially circular manner when the arms are in the engaged position around the columnar item; the support band portions adapted to engage and support the columnar item adjacent the location where the columnar item will be cut;
    the outer end portions being spaced apart a distance greater than the outer diameter of the columnar item to be cut when the arms are in the disengaged position;
    an arm actuator associated with each arm; each arm actuator configured to move the arm back and forth between the disengaged and engaged positions; the arm actuators adapted to apply a clamping force to the arms in the engaged position;
    each arm being connected to the frame at an arm pivot mount; each arm actuator being connected to an arm at an actuator pivot mount; a reference line passing through the arm pivot mount and the actuator pivot mount being perpendicular to the blade direction when the arms are in the engaged position;
    a blade carried by the frame; and
    a blade actuator associated with the blade; the blade actuator adapted to move the blade between retracted and extended positions.

2. The apparatus of claim 1, wherein the frame includes a removable blade cover; some of the removable collar segments being carried by the removable blade cover; and portion of the blade being disposed under the blade cover when the blade is in the disengaged position.

3. The apparatus of claim 1, wherein the arms define a blade slot that extends through the outer end portions of the arms; the blade being disposed in the blade slot when the blade is in the extended position.

4. The apparatus of claim 3, wherein the blade has a pair of lateral edges; the frame including a pair of opposed removable lateral blade guides; the lateral edges of the blade being disposed in the removable lateral blade guides.

5. An apparatus for cutting a columnar item having an outer diameter, the apparatus comprising:
    a frame defining upper and lower recessed frame arcs;
    a pair of arms having outer end portions; each of the arms being pivotably connected to the frame; each of the arms being movable between disengaged and engaged positions;
    the arms defining a blade slot, an upper recessed arm arc, and a lower recessed arm arc;
    when the arms are in the engaged position, the upper recessed arm arc cooperating with the upper recessed frame arc to define an upper recessed ring; when the arms are in the engaged position, the lower recessed arm arc cooperating with the lower recessed frame arc to define a lower recessed ring;
    an upper segmented collar carried by the upper recessed ring and a lower segmented collar carried by the lower recessed ring;
    each of the segmented collars defining support band portions immediately adjacent the blade slot; the support band portions adapted to engage and support the columnar item adjacent the location where the columnar item will be cut, wherein the support band portions defined by said upper and said lower segmented collars are substantially circular; wherein the upper and lower segmented collars are removably mounted on the arms and frame, the upper and lower segmented collars are adapted to engage and support the columnar item adjacent the location where the columnar item will be cut;
    the outer end portions of the arms being spaced apart a distance greater than the outer diameter of the columnar item to be cut when the arms are in the disengaged position;
    an arm actuator associated with each arm; each arm actuator configured to move the arm back and forth between the disengaged and engaged positions; the arm actuators adapted to apply a clamping force to the arms in the engaged position;
    each arm being connected to the frame at an arm pivot mount; each arm actuator being connected to an arm at an actuator pivot mount; a reference line passing through the arm pivot mount and the actuator pivot mount being perpendicular to the blade direction when the arms are in the engaged position;
    a blade carried by the frame; and
    a blade actuator associated with the blade; the blade actuator adapted to move the blade between retracted and extended positions.

6. The apparatus of claim 5, wherein the frame includes a removable blade cover; the upper recessed frame arc being defined by the removable blade cover; the blade being disposed under the blade cover when the blade is in the disengaged position.

7. The apparatus of claim 6, wherein the blade has a pair of lateral edges; the frame including a pair of opposed removable lateral blade guides; the lateral edges of the blade being disposed in the removable lateral blade guides.

8. The apparatus of claim 7, wherein portions of the removable lateral blade guides are carried by the removable blade cover.

9. The apparatus of claim 8, wherein a portion of each arm is disposed over the removable blade cover with the arms are in the engaged position.

* * * * *